(12) United States Patent
Kapanen

(10) Patent No.: US 6,792,274 B1
(45) Date of Patent: Sep. 14, 2004

(54) METHOD FOR DISTRIBUTING THE CAPACITY OF A TRANSMISSION SYSTEM IN A BASE STATION NETWORK

(75) Inventor: Jouko Kapanen, Helsinki (FI)

(73) Assignee: Nokia Networks Oy, Nokia Group (FI)

(*) Notice: Subject to any disclaimer, the term of this patent is extended or adjusted under 35 U.S.C. 154(b) by 0 days.

(21) Appl. No.: 09/529,507

(22) PCT Filed: Oct. 22, 1998

(86) PCT No.: PCT/FI98/00921

§ 371 (c)(1),
(2), (4) Date: May 5, 2000

(87) PCT Pub. No.: WO99/22535

PCT Pub. Date: May 6, 1999

(30) Foreign Application Priority Data

Oct. 23, 1997 (FI) .................................................. 974034

(51) Int. Cl.[7] ................................................ H04Q 7/20
(52) U.S. Cl. ........................ 455/450; 455/447; 455/449; 455/453; 455/511; 370/329; 370/341
(58) Field of Search ................................. 455/453, 450, 455/452, 422, 447, 449, 509, 511; 370/331, 335, 228, 329, 341, 342, 348

(56) References Cited

U.S. PATENT DOCUMENTS

| | | | | |
|---|---|---|---|---|
| 5,715,245 A | * | 2/1998 | Suonvieri | 370/337 |
| 5,722,043 A | * | 2/1998 | Rappaport et al. | 455/33.1 |
| 5,748,624 A | * | 5/1998 | Kondo | 370/347 |
| 5,831,976 A | * | 11/1998 | Lin et al. | 370/329 |
| 6,047,187 A | * | 4/2000 | Haartsen | 455/450 |
| 6,069,871 A | * | 5/2000 | Sharma et al. | 370/209 |
| 6,175,737 B1 | * | 1/2001 | Kao | 455/447 |
| 6,219,541 B1 | * | 4/2001 | Brodie | 455/422 |

FOREIGN PATENT DOCUMENTS

| | | | |
|---|---|---|---|
| EP | 0720405 A2 | 7/1996 | H04Q/7/36 |
| WO | WO 93/07725 | 4/1993 | H04Q/7/04 |
| WO | WO95/01015 | 1/1995 | H04J/3/16 |
| WO | WO 95/32591 | 11/1995 | H04Q/7/36 |
| WO | WO 97/12492 | 4/1997 | H04Q/7/36 |

* cited by examiner

Primary Examiner—William Trost
Assistant Examiner—Danh Le
(74) Attorney, Agent, or Firm—Cohen, Pontani, Lieberman & Pavane (57) ABSTRACT

In a system handling communication between base transceiver stations (BTS1–BTS12) and base station controllers (BSC) of a cellular radio network the transmission capacity is composed of a predetermined number of capacity units (T0–T31). At least one capacity unit (TCH) can be allocated to a given base station group which comprises at least two base transceiver stations. Said capacity unit is allocated to a certain base transceiver station in the base station group when the instantaneous volume of traffic handled by said base transceiver station requires temporary allocation of additional capacity, and said capacity unit is again released so as to be allocatable to the base station group when the instantaneous volume of traffic handled by said base transceiver station no longer requires temporary allocation of additional capacity.

10 Claims, 10 Drawing Sheets

| | | | | |
|---|---|---|---|---|
| T0 | | | | |
| T1 | TCH1 | TCH2 | TCH3 | TCH4 |
| T2 | TCH5 | TCH6 | TCH7 | TCH8 |
| T3 | TCH1 | TCH2 | TCH3 | TCH4 |
| T4 | TCH5 | TCH6 | TCH7 | TCH8 |
| T5 | TCH1 | TCH2 | TCH3 | TCH4 |
| T6 | TCH5 | TCH6 | TCH7 | TCH8 |
| T7 | TCH1 | TCH2 | TCH3 | TCH4 |
| T8 | TCH5 | TCH6 | TCH7 | TCH8 |
| T9 | TCH1 | TCH2 | TCH3 | TCH4 |
| T10 | TCH5 | TCH6 | TCH7 | TCH8 |
| T11 | TCH1 | TCH2 | TCH3 | TCH4 |
| T12 | TCH5 | TCH6 | TCH7 | TCH8 |
| T13 | TCH1 | TCH2 | TCH3 | TCH4 |
| T14 | TCH5 | TCH6 | TCH7 | TCH8 |
| T15 | TCH1 | TCH2 | TCH3 | TCH4 |
| T16 | TCH5 | TCH6 | TCH7 | TCH8 |
| T17 | TCH1 | TCH2 | TCH3 | TCH4 |
| T18 | TCH5 | TCH6 | TCH7 | TCH8 |
| T19 | TCH1 | TCH2 | TCH3 | TCH4 |
| T20 | TCH5 | TCH6 | TCH7 | TCH8 |
| T21 | TCH1 | TCH2 | TCH3 | TCH4 |
| T22 | TCH5 | TCH6 | TCH7 | TCH8 |
| T23 | TCH1 | TCH2 | TCH3 | TCH4 |
| T24 | TCH5 | TCH6 | TCH7 | TCH8 |
| T25 | TRXSIG 1 | OMUSIG 1 | TRXSIG 2 | X |
| T26 | TRXSIG 3 | X | TRXSIG 4 | X |
| T27 | TRXSIG 5 | X | TRXSIG 6 | X |
| T28 | TRXSIG 7 | OMUSIG 2 | TRXSIG 8 | X |
| T29 | TRXSIG 9 | OMUSIG 3 | TRXSIG 10 | X |
| T30 | TRXSIG 11 | OMUSIG 4 | TRXSIG 12 | X |
| T31 | X | X | X | X |

TRX 1, TRX 2, TRX 3, TRX 4, TRX 5, TRX 6, TRX 7, TRX 8, TRX 9, TRX 10, TRX 11, TRX 12 (each spanning two rows of the TCH entries).

| | | | | |
|---|---|---|---|---|
| T0 | | | | |
| T1 | TCH1 | TCH2 | TCH3 | TCH4 |
| T2 | TCH5 | TCH6 | TCH7 | TCH8 |
| T3 | TCH1 | TCH2 | TCH3 | TCH4 |
| T4 | TCH5 | TCH6 | TCH7 | TCH8 |
| T5 | TCH1 | TCH2 | TCH3 | TCH4 |
| T6 | TCH5 | TCH6 | TCH7 | TCH8 |
| T7 | TCH1 | TCH2 | TCH3 | TCH4 |
| T8 | TCH5 | TCH6 | TCH7 | TCH8 |
| T9 | TCH1 | TCH2 | TCH3 | TCH4 |
| T10 | TCH5 | TCH6 | TCH7 | TCH8 |
| T11 | TCH1 | TCH2 | TCH3 | TCH4 |
| T12 | TCH5 | TCH6 | TCH7 | TCH8 |
| T13 | TCH1 | TCH2 | TCH3 | TCH4 |
| T14 | TCH5 | TCH6 | TCH7 | TCH8 |
| T15 | TCH1 | TCH2 | TCH3 | TCH4 |
| T16 | TCH5 | TCH6 | TCH7 | TCH8 |
| T17 | TCH1 | TCH2 | TCH3 | TCH4 |
| T18 | TCH5 | TCH6 | TCH7 | TCH8 |
| T19 | TCH | TCH | TCH | TCH |
| T20 | TCH | TCH | TCH | TCH |
| T21 | TCH | TCH | TCH | TCH |
| T22 | TCH | TCH | TCH | TCH |
| T23 | TCH | TCH | TCH | TCH |
| T24 | TCH | TCH | TCH | TCH |
| T25 | TRXSIG 1 | OMUSIG 6 | TRXSIG 2 | TRXSIG 15 |
| T26 | TRXSIG 3 | X | TRXSIG 4 | X |
| T27 | TRXSIG 5 | OMUSIG 1 | TRXSIG 6 | X |
| T28 | TRXSIG 7 | OMUSIG 2 | TRXSIG 8 | X |
| T29 | TRXSIG 9 | OMUSIG 3 | TRXSIG 10 | X |
| T30 | TRXSIG 11 | OMUSIG 4 | TRXSIG 12 | X |
| T31 | TRXSIG 13 | OMUSIG 5 | TRXSIG 14 | X |

TRX 1
TRX 2
TRX 3
TRX 5
TRX 7
TRX 9
TRX 11
TRX 13
TRX 15
TRX 4,10
TRX 6,12
TRX 8,14

|     |          |           |           |          |
|-----|----------|-----------|-----------|----------|
| T0  |          |           |           |          |
| T1  | TCH      | TCH       | TCH       | TCH      |
| T2  | TCH      | TCH       | TCH       | TCH      |
| T3  | TCH      | TCH       | TCH       | TCH      |
| T4  | TCH      | TCH       | TCH       | TCH      |
| T5  | TCH      | TCH       | TCH       | TCH      |
| T6  | TCH      | TCH       | TCH       | TCH      |
| T7  | TCH      | TCH       | TCH       | TCH      |
| T8  | TCH      | TCH       | TCH       | TCH      |
| T9  | TCH      | TCH       | TCH       | TCH      |
| T10 | TCH      | TCH       | TCH       | TCH      |
| T11 | TCH      | TCH       | TCH       | TCH      |
| T12 | TCH      | TCH       | TCH       | TCH      |
| T13 | TCH      | TCH       | TCH       | TCH      |
| T14 | TCH      | TCH       | TCH       | TCH      |
| T15 | TCH      | TCH       | TCH       | TCH      |
| T16 | TCH      | TCH       | TCH       | TCH      |
| T17 | TCH      | TCH       | TCH       | TCH      |
| T18 | TCH      | TCH       | TCH       | TCH      |
| T19 | TRXSIG 1 | TRXSIG 13 | TRXSIG 25 | OMUSIG 1 |
| T20 | TRXSIG 2 | TRXSIG 14 | TRXSIG 26 | OMUSIG 2 |
| T21 | TRXSIG 3 | TRXSIG 15 | TRXSIG 27 | OMUSIG 3 |
| T22 | TRXSIG 4 | TRXSIG 16 | TRXSIG 28 | OMUSIG 4 |
| T23 | TRXSIG 5 | TRXSIG 17 | TRXSIG 29 | OMUSIG 5 |
| T24 | TRXSIG 6 | TRXSIG 18 | TRXSIG 30 | OMUSIG 6 |
| T25 | TRXSIG 7 | TRXSIG 19 | TRXSIG 31 | OMUSIG 7 |
| T26 | TRXSIG 8 | TRXSIG 20 | TRXSIG 32 | OMUSIG 8 |
| T27 | TRXSIG 9 | TRXSIG 21 | TRXSIG 33 | OMUSIG 9 |
| T28 | TRXSIG 10| TRXSIG 22 | TRXSIG 34 | OMUSIG 10|
| T29 | TRXSIG 11| TRXSIG 23 | TRXSIG 35 | OMUSIG 11|
| T30 | TRXSIG 12| TRXSIG 24 | TRXSIG 36 | OMUSIG 12|
| T31 | X        | X         | X         | X        |

Rows T1–T18: TRX 1-36

METHOD FOR DISTRIBUTING THE CAPACITY OF A TRANSMISSION SYSTEM IN A BASE STATION NETWORK

This is a national stage of PCT application no. PCT/FI98/00821, filed on Oct. 22, 1998. Priority is claimed on that application, and on patent application no. FI 974034, filed on Oct. 23, 1997.

The invention relates to a method defined in the preamble of claim 1 for distributing the capacity of a transmission system in a base station network, which method makes it possible to increase the number of base stations using a given transmission system and/or improve the utilization rate of the transmission system. The invention also relates to a transmission system applying such a method.

Communication between a base station controller (BSC) and the base transceiver stations (BTS) controlled by it in a GSM (Global System for Mobile telecommunications) network, for example, are usually arranged as follows: Transmission is realized using bi-directional time-division-based 2-Mbps systems. A system includes thirty-two 64-kbps time slots each of which can be divided into four 16-kbps partial time slots. One (point-to-point) or several base transceiver stations may be connected to such a system in a chain, multidrop, loop or star configuration. Base transceiver stations have one or more transmitter/receiver (TRX) units which comprise eight 16-kbps bi-directional traffic channels (TCH). For each TRX unit the transmission system allocates in a fixed manner two time slots for traffic channels and one 16-kbps partial time slot for TRX signalling (TRXSIG). In addition, the system reserves in a fixed manner for each base transceiver station one 16-kbps partial time slot for operation and maintenance unit signalling (OMUSIG). Thus, one transmission system suffices for 12 TRX units. In this maximum case only a few partial time slots are left unused; the exact quantity depends on how many base transceiver stations the TRX units are divided into. There are also arrangements in which the traffic of 10 TRX units is placed in the 2-Mbps system. Furthermore, there are arrangements in which some of the transmission system time slots contain GSM traffic and some contain NMT (Nordisk MobilTelefon) traffic or the traffic or paging traffic of some other cellular radio system.

Figure 1A:
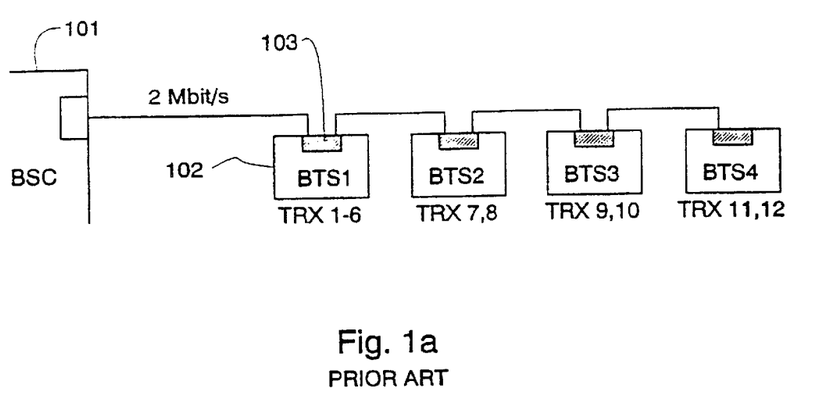
FIGS. 1a–1c are examples of known base station networks.
Figure 2:
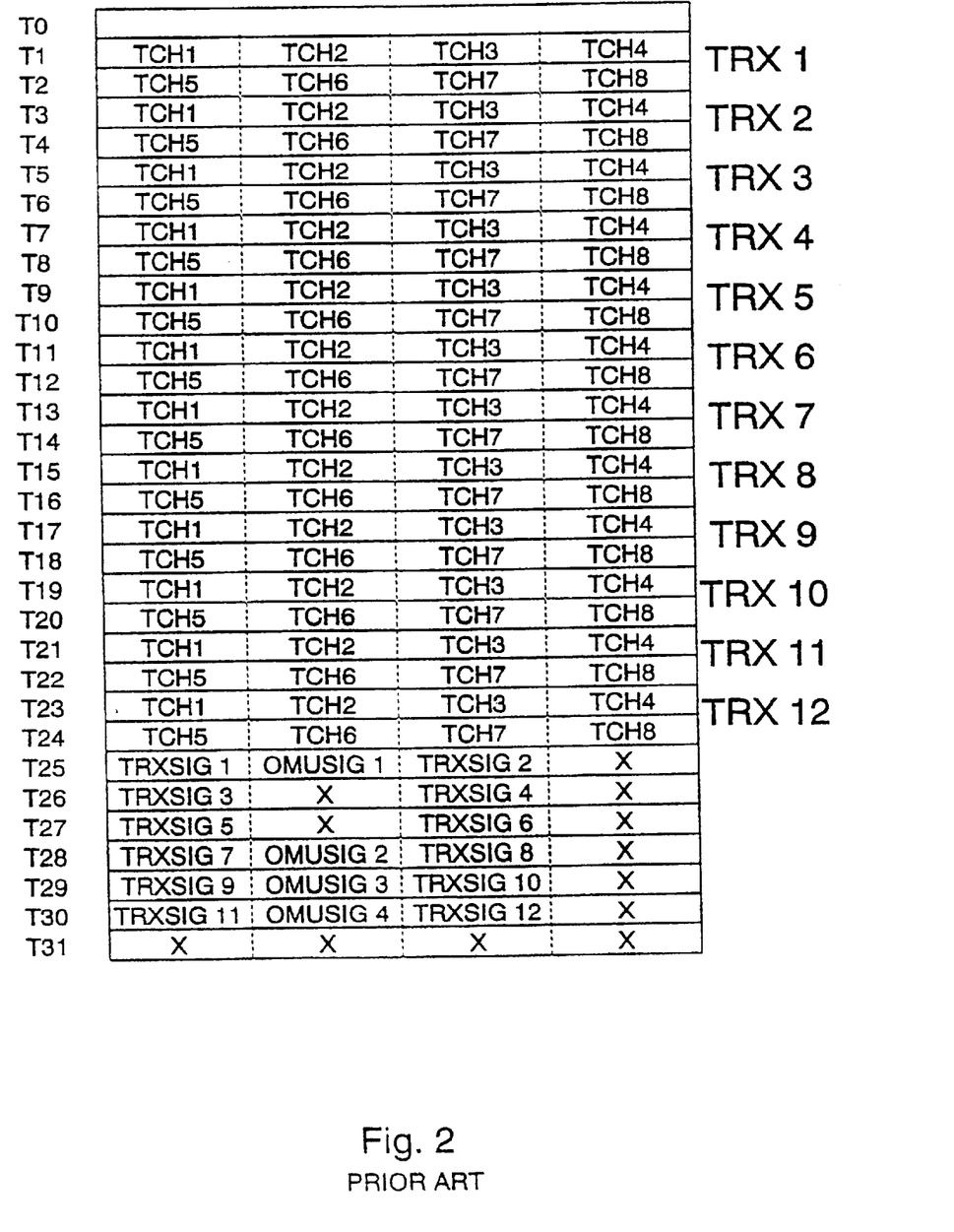
FIG. 2 illustrates the current usage of transmission system time slots in a network according to FIG. 1a, FIG. 3 shows a known base transceiver station in a loop-configured base station network.

The method according to the prior art and a system embodying it are disclosed e.g. in a Nokia Telecommunications document "TRUA Base Station Transmission Unit, Product Description", NTC C33315002SE_B0, Nokia Telecomnunications Oy 1995–1996. FIG. 1a shows a possible base station network using a 2-Mbps transmission system. The base transceiver stations in it are chained through a cable originating from a base station controller 101. Base transceiver station BTS1 (102) has six TRX units sectored e.g. in such a manner that each of the three sectors has two TRX units. Base transceiver stations BTS2, BTS3 and BTS4 each have two omnidirectional TRX units. The interface unit 103 in base transceiver station BTS1 connects in bi-directional manner time slots T1–T12 to the radio channels of the TRX units. Placement of traffic channels TCH in the time slots is shown in more detail in FIG. 2. Rows in the table correspond to time slots T0–T31 and X indicates that the partial time slot in question is unused. Similarly, base transceiver station BTS2 reserves time slots T13–T16, BTS3 time slots T17–T20, and BTS4 time slots T21–T24.

Separate time slots must be allocated for signalling (TRXSIG) and operation and maintenance (OMUSIG). In the exemplary case, base transceiver station BTS1 uses for these purposes time slots T25, T26 and T27, BTS2 uses time slot T28, BTS3 time slot T29 and BTS4 time slot T30 in accordance with FIG. 2.

Figure 1B:
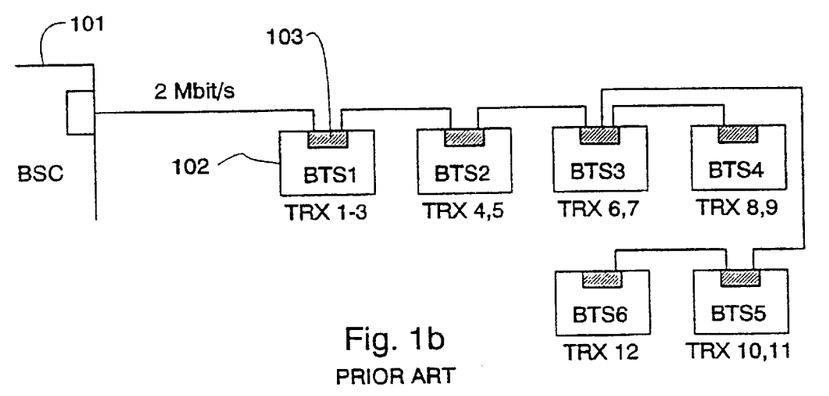
Figure 1C:
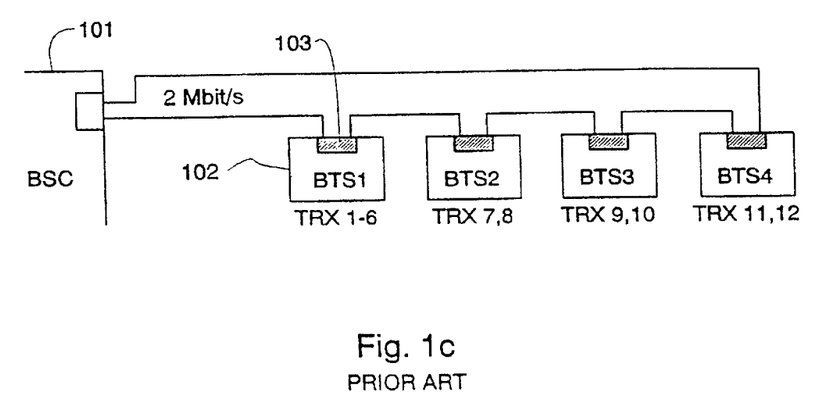
Figure 3:
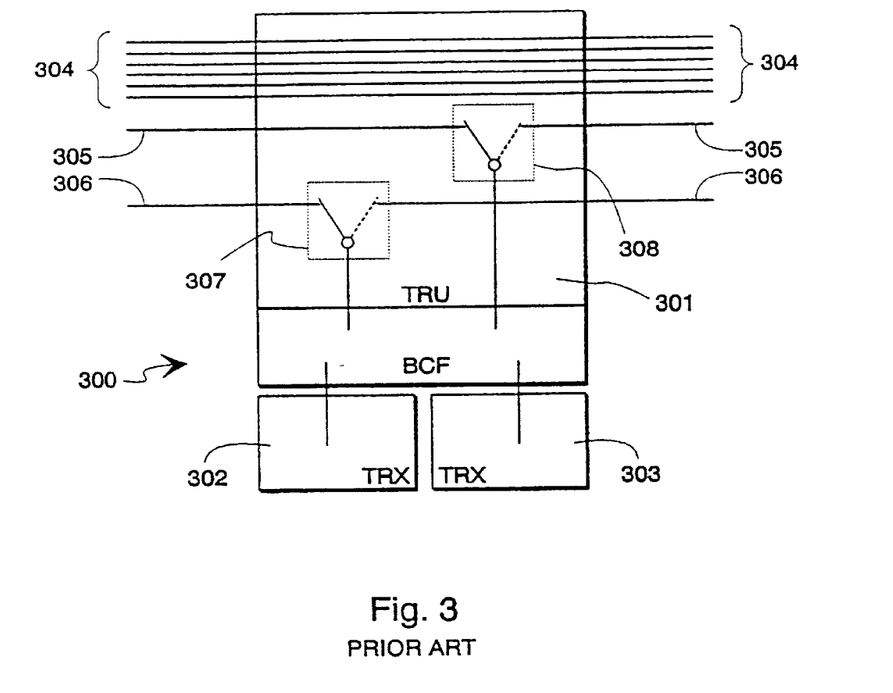

The base station network shown in FIG. 1a has a chain topology. In FIG. 1b, the base station network has a star topology as a connection is branched from base transceiver station BTS3 to two other base transceiver stations BTS5 and BTS6. TRX units are distributed between the base transceiver stations slightly differently from FIG. 1a in order to keep their total number the same. In FIG. 1c the base station network has a loop topology as a direct communications connection is provided between base transceiver station BTS4 and the base station controller BSC. The loop topology is used in prior-art base station networks mainly for securing communications as in this configuration all base transceiver stations in the base station network have two alternative communications connections with the base station controller (the alternative connections are in the opposite directions of the loop formed by the base transceiver stations). FIG. 3 schematically illustrates a base transceiver station 300 in such a loop-configured base station network. Communication between the base transceiver station 300 and other apparatus in the same base station network takes place through a transmission unit 301 (TRU). The transmission unit 301 is a cross-connect in which a certain branching table (not shown) determines how the various time slots are connected straight through the transmission unit 301 from left to right (or from right to left) and which time slots are connected via the lower part of the transmission unit 301 to the base transceiver station control functions (BCF) part. Through the latter, the transmission capacity represented by the time slots is distributed between the TRX units 302 and 303 of the base transceiver station. In accordance with the usual practice, FIG. 3 shows the various time slots as separate signal lines although in reality they are transferred via the same physical connection. This example assumes that six time slots are connected straight through the transmission unit 301 (lines 304) and two time slots are connected to the base transceiver station's TRX units 302 and 303 (lines 305 and 306).

In FIG. 3 the transmission unit 301 comprises two so-called Y-type protection switches 307 and 308 by means of which the system utilizes the loop topology of the base station network. The transmission unit monitors the so-called pilot information accompanying the signals coming from the different transmission directions and determines whether the time slots used by the base transceiver station's TRX units 302 and 303 should be routed via the left-hand-side path or via the right-hand-side path between the base transceiver station and base station controller. In FIG. 3, the transmission unit has detected that the time slots represented by lines 305 and 306 should be transmitted via the left route, so the protection switches 307 and 308 have been set so as to connect the base transceiver station's TRX units 302 and 303 to the left branches of lines 305 and 306. In case of a different measurement result one or both of the protection switches 307 and 308 could be set into the other position indicated by the broken line, in which case the traffic in the time slot in question would be routed via the right-hand-side path in the base transceiver station 300. Setting of the protection switches 307 and 308 is realized such that a change is made in the current branching table in the transmission unit 301. It is obvious that in this context the directional terms "left", "right" and "down" only refer to the orientation shown FIG. 3 and bear no relation to the actual situation.

A disadvantage of the present method is that the transmission system reserves capacity for the base transceiver stations' TRX units according to the maximum traffic, regardless of the actual traffic situation. Thus, at times, the network operator has to pay for unnecessary transmission capacity. A further disadvantage of the present method is that if additional mobile communications capacity has to be built in a given area to such an extent that the number of TRX units exceeds 12, the operator has to provide a new, even more underutilized transmission system.

The object of the invention is to reduce the disadvantages mentioned above. The method according to the invention is characterized by what is expressed in the independent claims.

The basic idea of the method is as follows: At least part of the time slots in the transmission system are shared by the base transceiver stations and their TRX units. A given time slot or partial time slot can at different moments be allocated to different TRX units according to the traffic situation. Some of the traffic time slots are allocated to the TRX units in a fixed manner and the rest are shared, or all time slots are shared. In the latter case, too, it is preferable to allocate fixed partial time slots for TRX signalling (TRXSIG) and operation and maintenance signalling (OMUSIG).

It is thus an advantage of the invention that the capacity of the transmission system can be utilized more efficiently, because it can always be directed to those TRX units, base transceiver stations and areas which have the most traffic. Compared to the current practice, more TRX units can be attached to the transmission system. This is significant, especially in the case where the network operator has to lease the transmission connections. Consequentially, it is a further advantage of the invention that as the amount of traffic increases in a given area, the introduction of a new transmission system can be postponed, as compared to the current practice.

BRIEF DESCRIPTION OF THE DRAWINGS

The invention will now be described in detail. In the description, reference will be made to the accompanying drawings wherein.

DETAILED DESCRIPTION OF THE PREFERRED EMBODIMENTS

Figure 4:
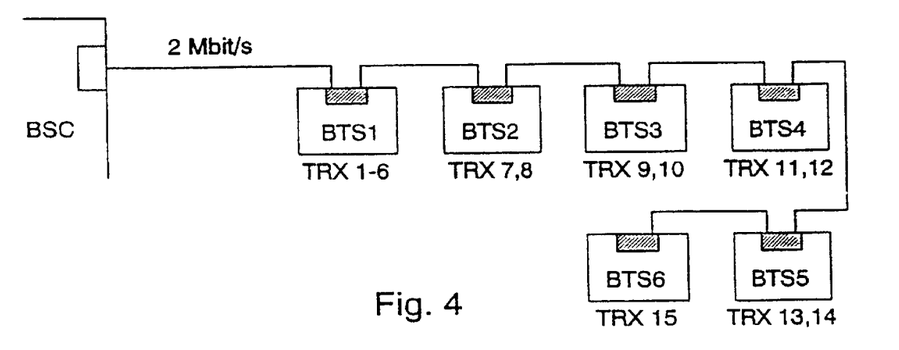
FIG. 4 shows the network of FIG. 1a expanded such that part of the transmission system capacity is shared by the TRX units in accordance with the invention.
Figure 5:
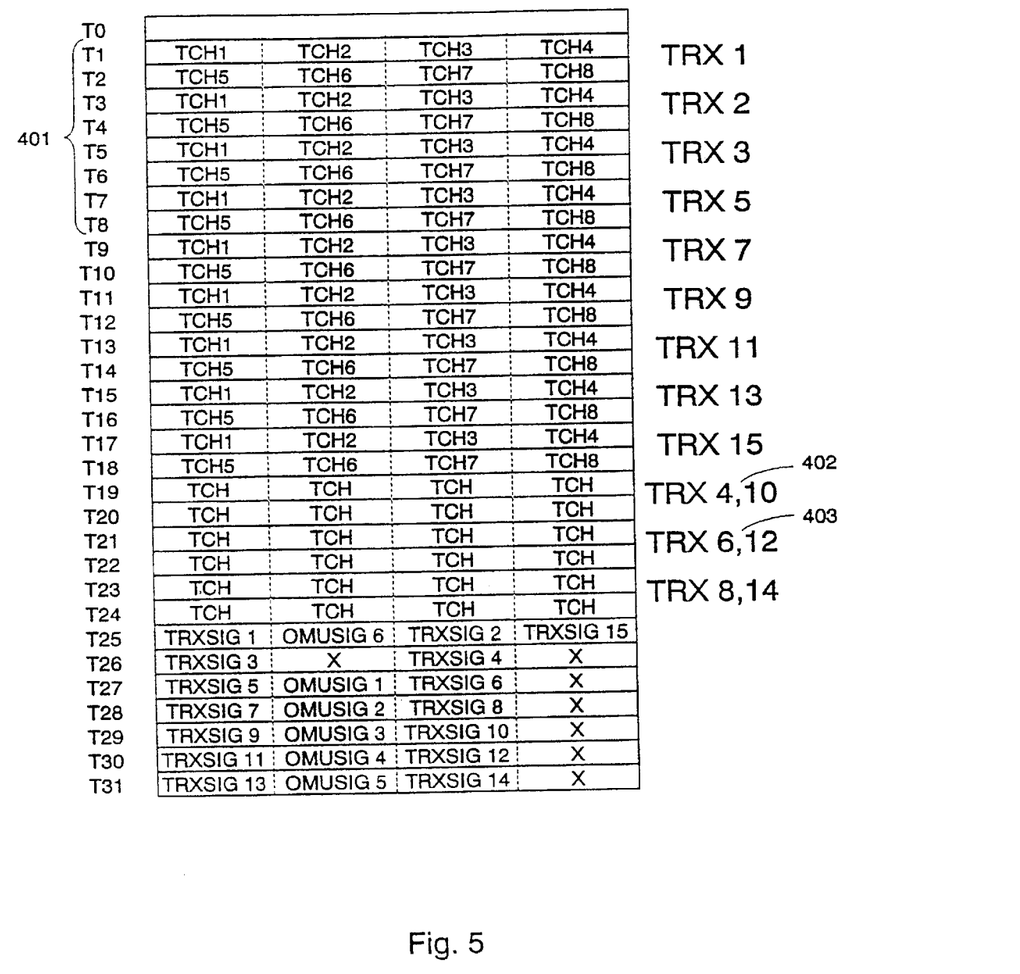
FIG. 5 illustrates the usage of transmission system time slots in accordance with the invention in a network according to FIG. 4.

FIGS. 4 and 5 illustrate an example of the method according to the invention. One base transceiver station BTS5 with two TRX units and one base transceiver station BTS6 with one TRX unit employing the transmission system have been added to the network. Similar to the prior art, some of the transmission system time slots are allocated in a fixed manner to TRX units, but certain time slots are always shared by two TRX units. Time slots T1–T8 (401) are allocated in a fixed manner to four TRX units in base transceiver station BTS1, and time slots T9 and T10 are allocated to one TRX unit in BTS2. Likewise, time slots T11–T16 are allocated to one TRX unit in base transceiver stations BTS3, BTS4 and BTS5, and time slots T17 and T18 are allocated to the only TRX unit in BTS6, as shown in FIG. 5. Time slots T19 and T20 are initially allocated to TRX 4 (402) in base transceiver station BTS1 and TRX 10 in BTS3. Similarly, time slots T21 and T22 are initially allocated to TRX 6 in BTS1 and the other TRX unit (403) in BTS4. Further, time slots T23 and T24 are initially allocated to the other TRX units in base transceiver stations BTS2 and BTS5 in accordance with FIG. 5.

Let units TRX 1 and TRX 2 in base transceiver station BTS1 represent sector 1, TRX 3 and TRX 4 sector 2, and TRX 5 and TRX 6 sector 3. If, for example, 8 traffic channels are not enough at a given moment in sector 2, base transceiver station BTS1 reserves time slot T19 if it is free. In this situation, base transceiver station BTS3 can use at most 12 traffic channels (8+4). If 12 channels are not enough in sector 2 of base transceiver station BTS1, the base transceiver station also reserves time slot T20 if it is free. This would leave only eight channels for base transceiver station BTS3. Likewise, BTS3 may reserve time slots T19 and T20 when they are free. So, time slots T19 and T20, as well as time slots T21–T24, are used according to the traffic situation. Since the traffic peaks in the various cells and sectors of cells usually do not coincide, the method described above does not significantly increase network congestion. Network design must allow for the temporal distribution of traffic peaks; in an area containing office buildings the traffic peaks occur at office hours, and in residential areas they occur outside office hours. A base station group, in which base stations share initially allocated time slots, should include base stations in which the traffic peaks are not likely to coincide.

FIG. 5 also shows a possible way of locating in the transmission system time slots the signalling and operation and maintenance signals, marked TRXSIG and OMUSIG.

Figure 6:
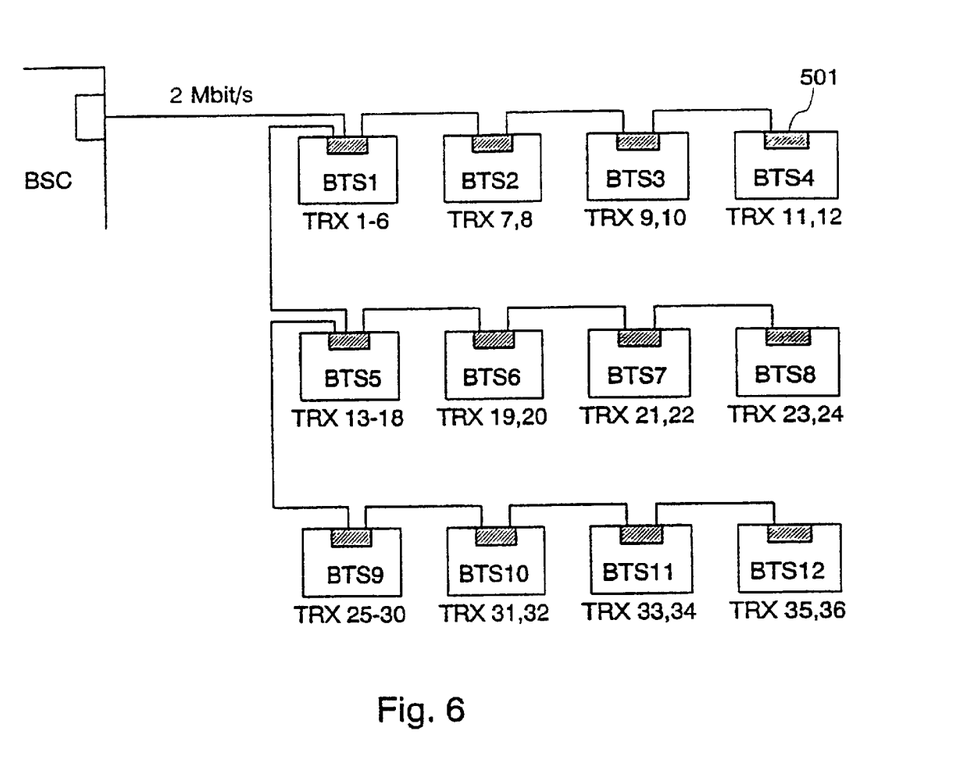
FIG. 6 shows a network expanded such that the whole traffic capacity of the transmission system is shared by the TRX units in accordance with the invention.
Figure 7:
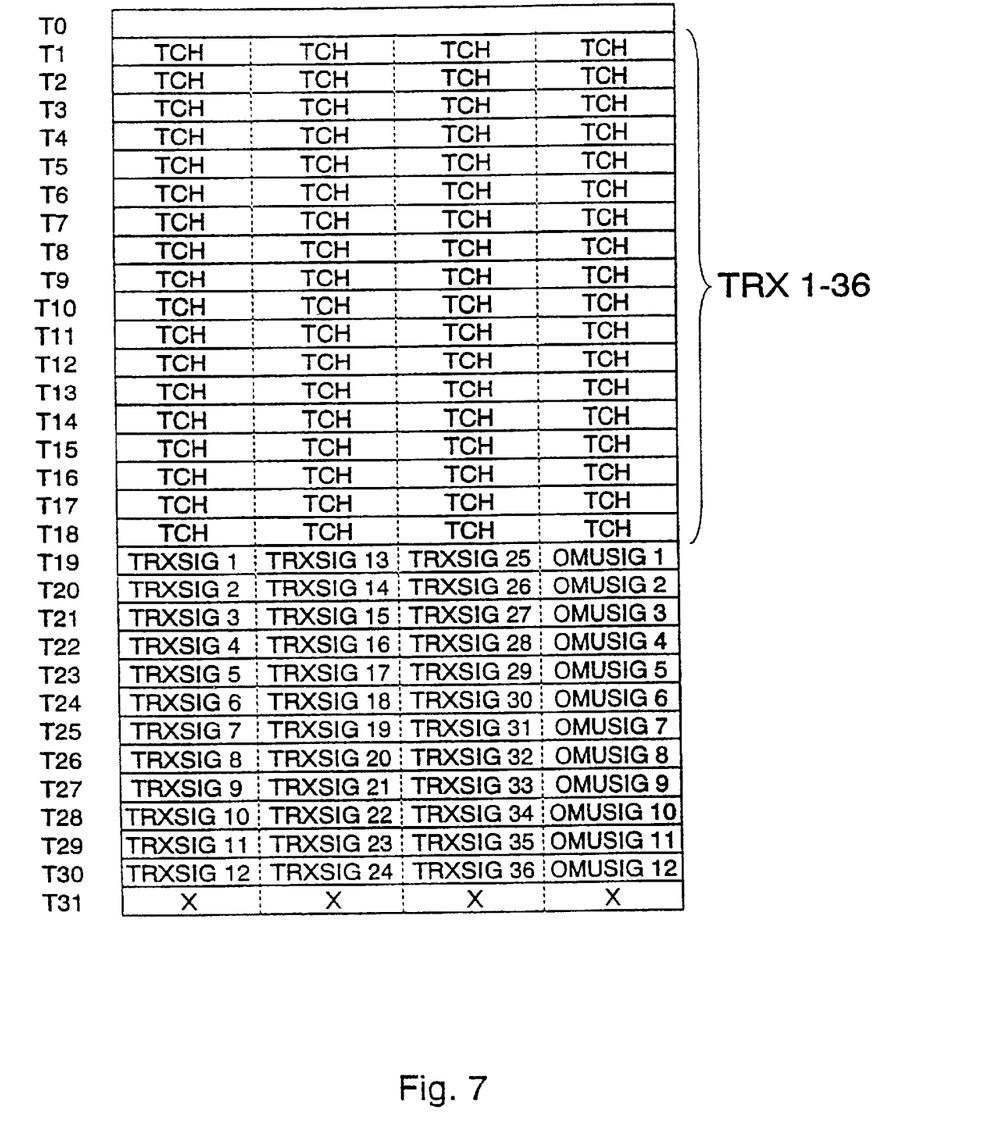
FIG. 7 illustrates the usage of transmission system time slots in the network of FIG. 6.

FIGS. 6 and 7 illustrate a second example of the method according to the invention. The number of TRX units is 36, or threefold compared to the case depicted by FIG. 1. Dynamic allocation of the transmission system capacity is now taken further than in the previous example. Let us assume that the rush-hour traffic peak value $E_h$ is the same in each TRX unit pair area and that $E_h=16$. Traffic volume is measured in traffic channels in use. Since instantaneous traffic volumes in different areas are independent of each other, the peak traffic values of the areas are summed squared. There are 18 TRX pairs, so the peak traffic $E_{hk}$ of the whole base station network is calculated from the formula $$E_{hk}=16\sqrt{18}=67.9\approx17.0\cdot4$$

Since one time slot can have four traffic channels, a 17-time slot capacity is enough for the traffic of the whole base station network if the traffic channels in all base stations are freely selectable. The example of FIGS. 6 and 7 assumes so. In accordance with FIG. 7, the number of traffic time slots is 18. All 72 traffic channels are shared by all 36 TRX units and their 288 radio channels, so it can be said that the time slots are initially allocated to all base stations.

Figure 8:
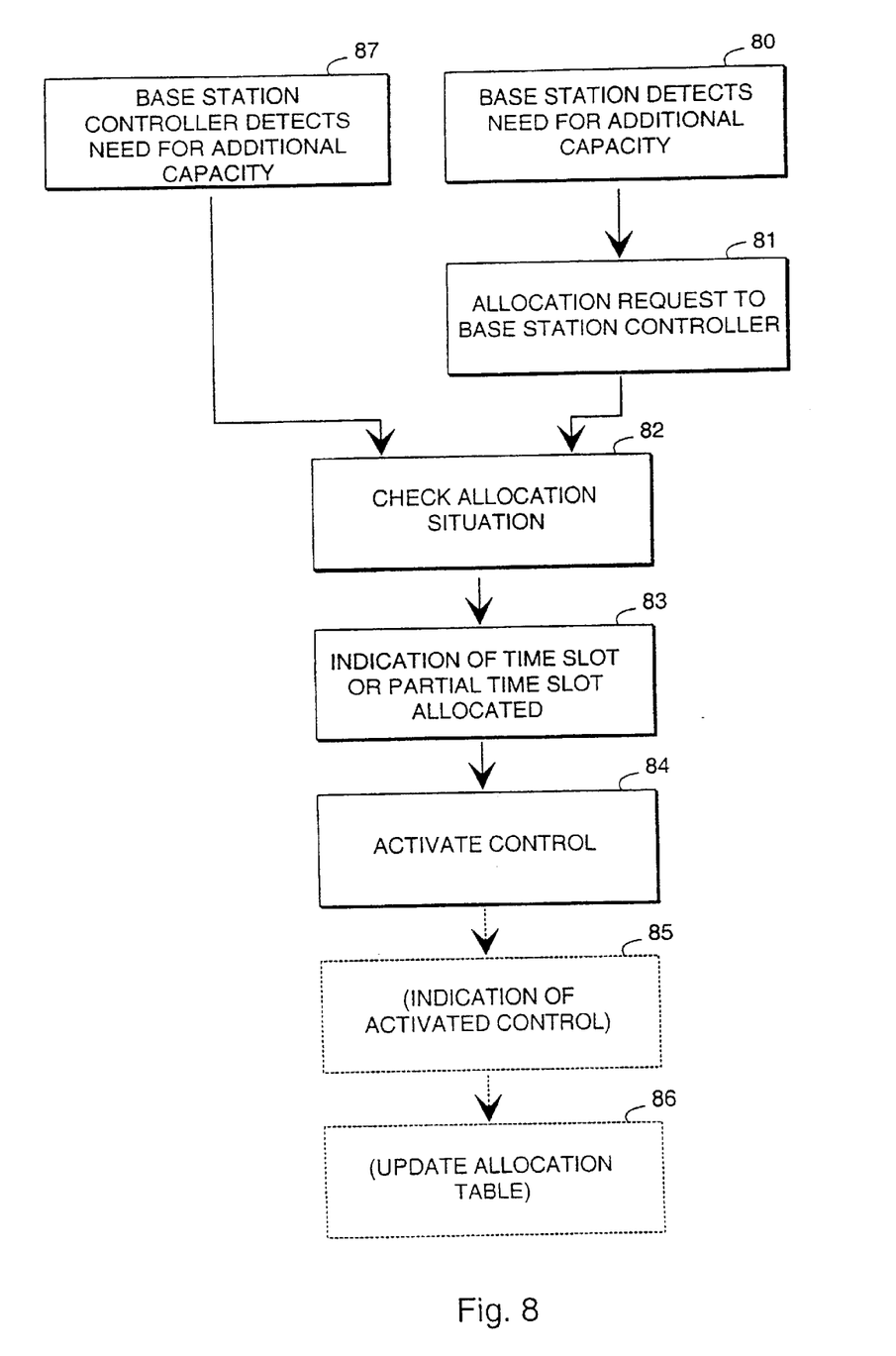
FIG. 8 illustrates the principle of allocating a time slot or partial time slot.

The procedure of allocating time slots or portions of time slots is described below, referring to FIG. 8. In step 80 a base transceiver station finds that it needs more capacity for the communication between itself and the base station controller. This find may be based on the fact that all time slots available to the base transceiver station are already full or that a portion (say, 80%) of the available time slots are fill, so that in the latter case the base transceiver station in a way anticipates that the capacity is about to come to an end. Step 81 in FIG. 8 represents an allocation request for a time slot or part of it, sent by the base transceiver station to the base station controller in the form of a standard message in a time slot available to the base transceiver station, preferably in a control information time slot like the OMUSIG or TRXSIG channel. In step 82 the base station controller checks the base station network's time slot allocation situation from a table that it maintains. If the base transceiver station's allocation request is acceptable (a suitable time slot or partial time slot is free) the base station controller indicates to the base transceiver station the identification of the time slot or partial time slot which is allocated to the base transceiver station, step 83. This indication is sent preferably in a control information time slot like the OMUSIG or TRXSIG channel. In response to said indication the base transceiver station activates a control, step 84, which sets up a connection between the allocated time slot (or partial time slot) and the downlink radio channel in the base transceiver station's cross-connect, or transmission unit. A more detailed discussion on the various connection types in the transmission unit follows later on. The base transceiver station may also inform the base station controller, in accordance with step 85, that a connection was made so that in response to that information the base station controller updates the allocation table such that the time slot or partial time slot is marked allocated to the base transceiver station in question, step 86. If the acknowledgment procedure according to steps 85 and 86 is not used, the allocation table is updated in conjunction with the checking of the allocation situation in step 82.

Allocation of additional capacity to a base transceiver station may also be initiated by the base station controller. In step 87 in FIG. 8 the base station controller detects that a mobile station located in the area of a given base transceiver station is about to receive a paging message, i.e. a request to establish a new connection. The base station controller also detects that the time slots allocated to the base transceiver station are already full of other traffic. So the base station controller starts the procedure according to step 82 in order to allocate a new time slot to the base transceiver station in the manner described above.

If the base station controller, when checking the allocation situation in accordance with step 82, finds that there are no suitable time slots or partial time slots free, it will not indicate allocation of a new time slot or partial time slot to the base transceiver station in accordance with step 83. FIG. 8 does not show the release of the additional capacity when the base transceiver station no longer needs it. The release may be based on a notice sent by the base transceiver station, indicating that additional capacity allocated earlier is no more needed. Alternatively, the base station controller may measure the traffic in each time slot and/or partial time slot and thus detect time slots or partial time slots that have no active traffic. If the allocation table shows that such a time slot or partial time slot belongs to the initially allocated "shared" capacity of a base station group and is now temporarily allocated to a given base transceiver station, the base station controller may send to that base transceiver station a deallocation notice and update the allocation table such that the time slot or partial time slot is again allocatable to any base transceiver station in that base station group.

Figure 9A:
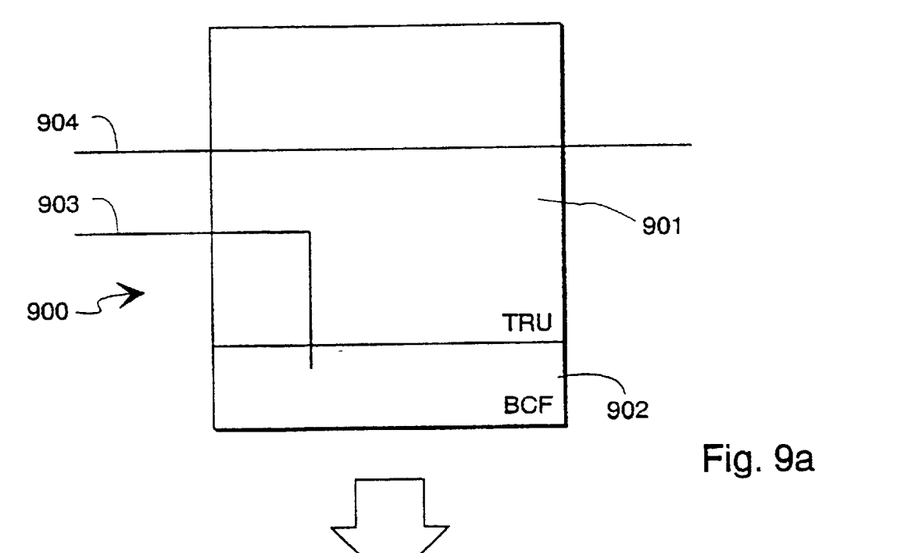
FIGS. 9a and 9b show a base transceiver station applying the principle according to the invention.

FIGS. 9a to 11 depict in more detail technical implementations used in the transmission units of base transceiver stations to make the base station network operate in accordance with the invention. FIGS. 9a and 9b show a base transceiver station 900 which has a transmission unit (TRU) 901 and a control functions part (BCF) 902 which distributes communications capacity to the TRX units (not shown). The base transceiver station 900 is allocated one time slot in a fixed manner. In addition, the base transceiver station 900 belongs to a base station group in which the base transceiver stations are initially allocated a time slot represented by signal line 904. In FIG. 9a the base transceiver station 900 has not reserved said time slot, so its transmission unit 901 connects signal line 904 representing the time slot straight through. In FIG. 9b the base transceiver station 900 has reserved, with permission from the base station controller (not shown), the time slot represented by signal line 904. In FIG. 9b the allocation has been made by adding to the branching table (not shown), which controls the operation of the transmission unit 901, a Y-type protection switch 905 which connects the left branch of signal line 904 to the base station control functions part 902. Instead of the protection switch one could have a similar straight connection from the left branch of signal line 904 to the base station control functions part as with signal line 903. If the base transceiver station depicted in FIGS. 9a and 9b belonged to a loop-configured base station network, it would be possible to disclose branching tables the first of which (in the situation depicted in FIG. 9a) would have one Y-type protection switch for signal line 903 and a straight connection through the transmission unit 901 for signal line 904. The second branching table (in the situation depicted in FIG. 9b) of the transmission unit 901 would include two Y-type protection switches both of which would be used in order to produce the best possible connection with the base station controller in the same manner as described above in conjunction with the description of the prior art, referring to FIG. 3.

Figure 10:
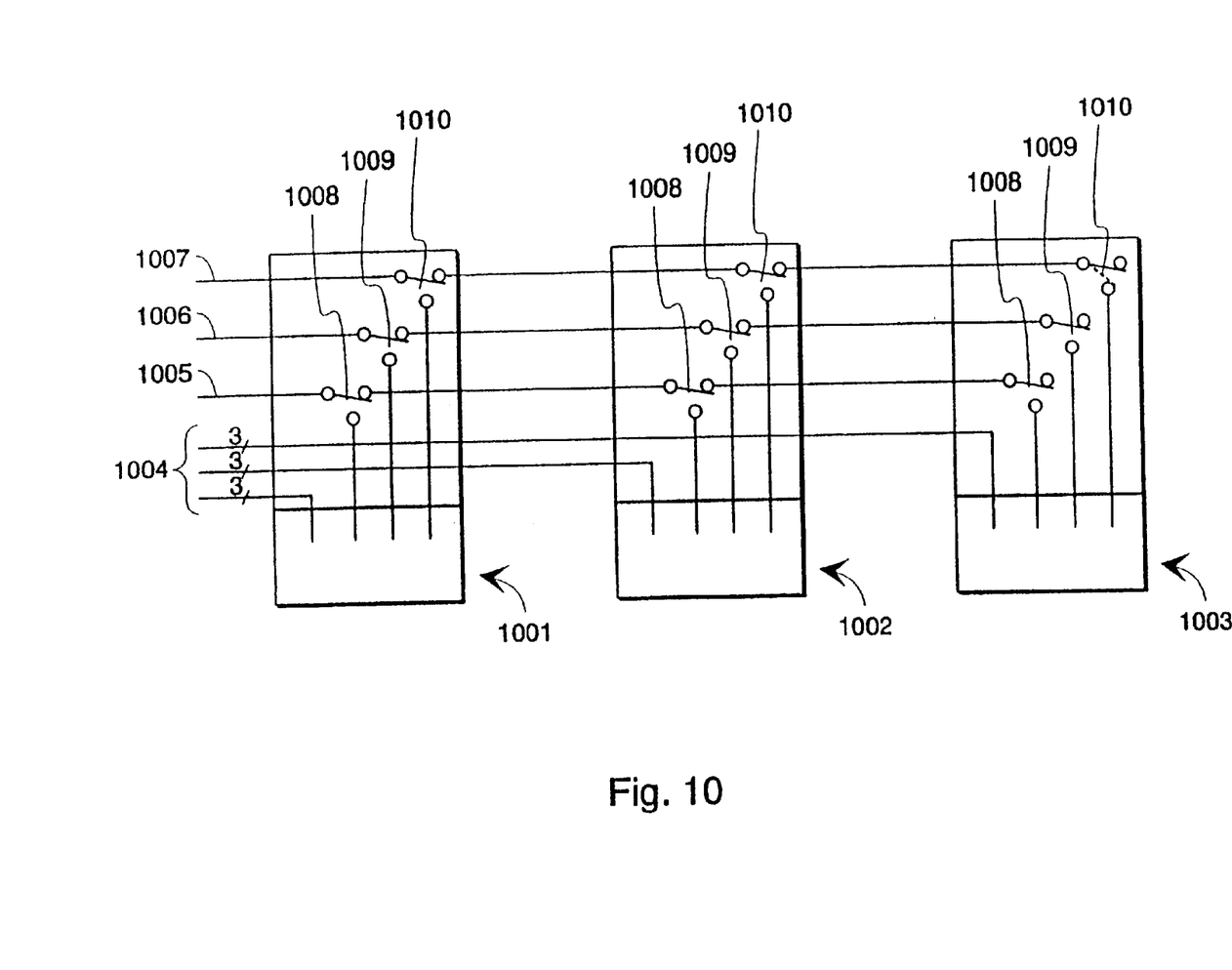
FIG. 10 shows a base station network applying the principle according to the invention.

The Y-type protection switch is not the only connection type that can be used in the transmission units of base transceiver stations in order to realize the invention. FIG. 10 shows a base station network comprising three base transceiver stations 1001, 1002 and 1003 where each base transceiver station is allocated in a fixed manner three of twelve possible time slots (tripled signal lines 1004). In addition, the time slots represented by signal lines 1005, 1006 and 1007 are initially allocated to the base station group comprised of the base transceiver stations in question. The transmission unit of each base transceiver station includes three branching switches 1008, 1009 and 1010 the positions of which determine the base station to which each of the initially allocated time slots is connected. In FIG. 10, these time slots are not allocated to any given base transceiver station, so all the branching switches 1008, 1009 and 1010 are in the upper position. If, for example, the time slot represented by signal line 1007 is allocated to base transceiver station 1003, the corresponding switches 1010 in base transceiver stations 1001 and 1002 are kept in the upper position, and switch 1010 in base transceiver station 1003 is turned to the lower position depicted by a broken line. So, in this case there is no need to introduce a totally new branching table in any of the base transceiver stations since certain two-position switches are already defined in the branching tables of the transmission units of all base transceiver stations.

Figure 9B:
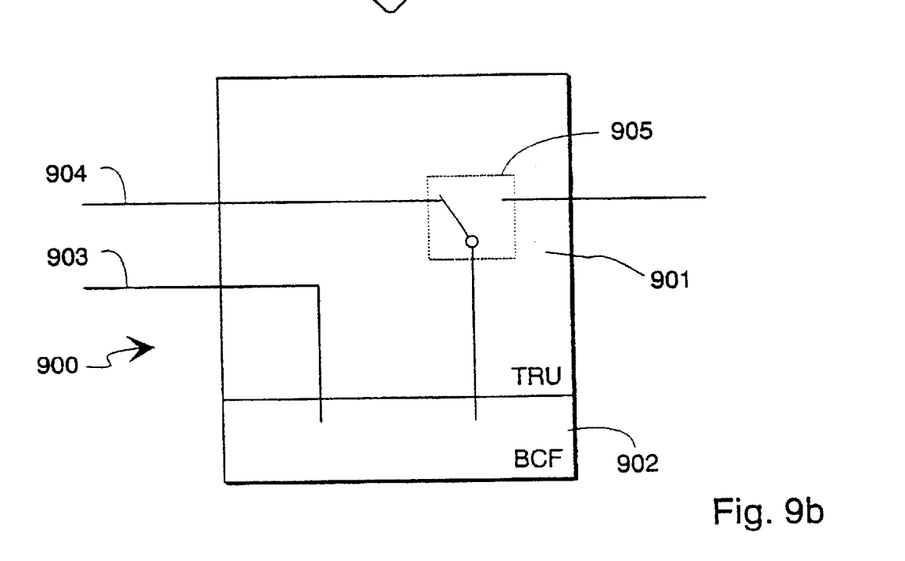

The branching switch shown in FIG. 10, which connects the inbound signal line either through the transmission unit or from the transmission unit to the control functions part, could be applied to the case depicted by FIGS. 9a and 9b. The branching table of the base station transmission unit of FIGS. 9a and 9b would in that case include a branching switch with which signal line 904 would be directed either through the transmission unit 901 or via it to the control functions part.

Figure 11:
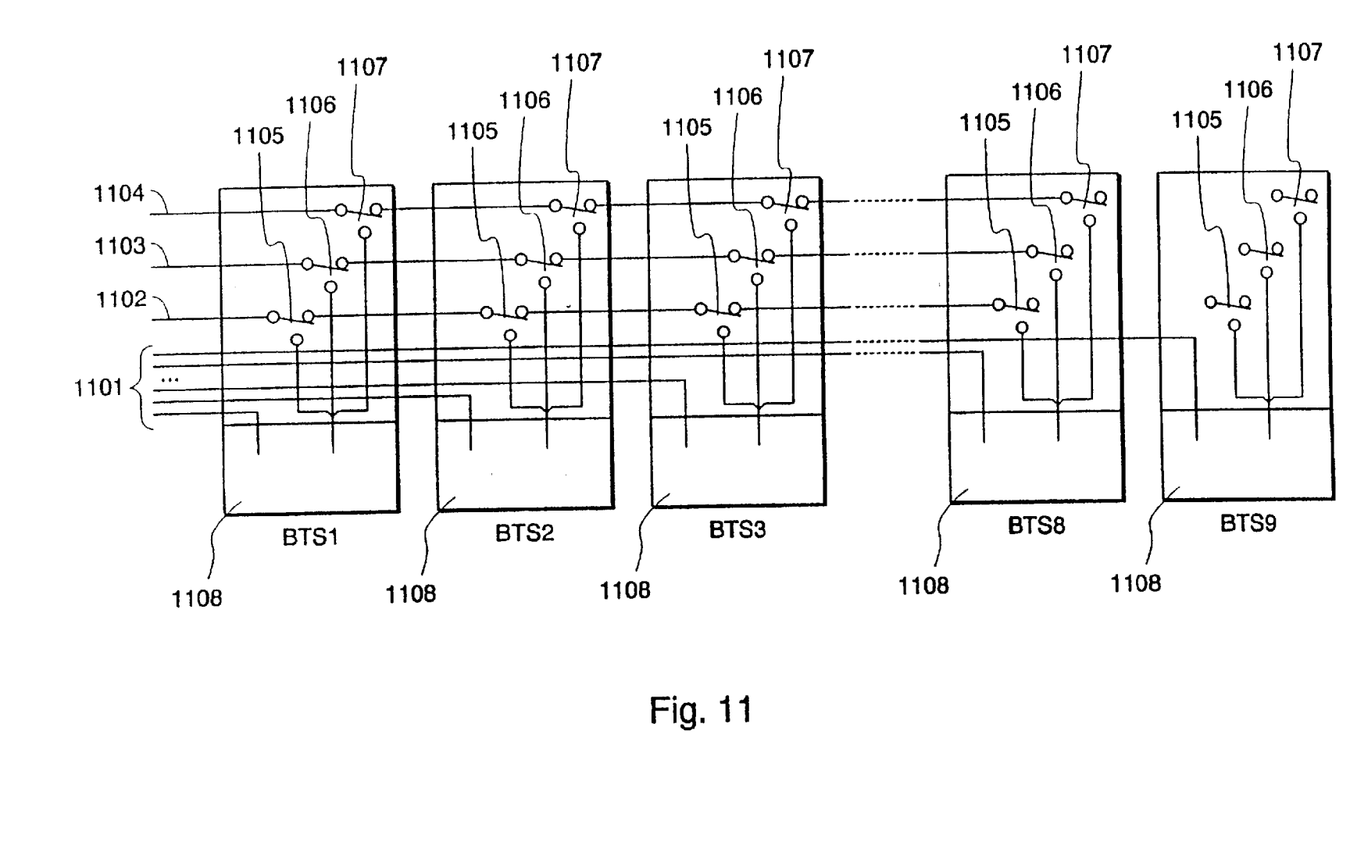
FIG. 11 shows a second base station network applying the principle according to the invention.

FIG. 10 assumes that each base transceiver station can take additional capacity regardless of which initially allocated time slot is addressed to it. So, each base transceiver station can use any one of the time slots represented by signal lines 1005, 1006 and 1007. However, base station architecture may cause that a given base transceiver station can only use a particular time slot as additional capacity. FIG. 11 shows a base station network in which the invention is applied in such a case. Base transceiver stations BTS1 to BTS9 form a chain-configured base station network where each base transceiver station is allocated one time slot (signal lines 1101) in a fixed manner. For simplicity, base transceiver stations BTS4 to BTS7 are left out of the drawing, but their position and connections can be easily deduced from the rest of the drawing. Three time slots (signal lines 1102, 1103 and 1104) are initially allocated to a base station group which includes all the base transceiver stations. Each base transceiver station has three branching switches 1105, 1106 and 1107 with one common line to the control functions part 1108. This case requires the use of so-called conditional branching tables, i.e. if a connection is modified in the transmission unit of a base transceiver station, the branching table in that transmission unit has to be changed. The base station control functions part need not know which time slot was allocated as additional capacity, because the transmission unit, controlled by the new branching table, directs the additional capacity represented by the allocated time slot to the base transceiver station always in the same way as seen from the control functions part.

Above it was discussed mainly 2-Mbps connections between base stations and base station controllers, in which traffic is divided into 32 time slots which can be further divided into four partial time slots. The invention is in no way limited to systems based on these figures but the inventional idea can be applied to all systems in which the communication between base stations and base station controllers is based on the allocation of time slots or similar capacity units. For example, other widely used data transmission rates apart from 2 Mbps are 1.5 Mbps, 1 Mbps and 0.5 Mbps. If the communication between the base stations and a base station controller takes place on multiple parallel frequency bands, the dynamic allocation method according to the invention can be used on all frequency bands or on some of the frequency bands.

Above it was-assumed that as regards time slot allocation the base stations are equal i.e. a free, allocatable time slot is allotted to the base station which first reserves it. Base stations may also be given priorities so that a given time slot may be primarily reserved to a certain base station and other base stations may reserve that time slot only if the primary base station does not need it.

What is claimed is:

1. A method for distributing transmission capacity in a system handling communication between base transceiver stations (BTS1–BTS12) and a base station controller (BSC) in a cellular radio network, wherein the transmission capacity is composed of a predetermined number of capacity units (T0–T31) which can be separately allocated, wherein at least one capacity unit (TCH) is allocatable to a given base station group, which comprises at least two base transceiver stations, said method comprising the steps of allocating at least one capacity unit to a first base transceiver station in said base station group when the instantaneous volume of traffic handled by said first base transceiver station requires temporary allocation of additional capacity, and releasing said at least one capacity unit so as to be allocatable to the given base station group when the instantaneous volume of traffic handled by said first base transceiver station no longer requires temporary allocation of additional capacity.

2. The method of claim 1, wherein said base station group includes only part of the base transceiver stations (TRX 4, 10; TRX 6, 12; TRX 8,14) operating under a given base station controller.

3. The method of claim 1, wherein said base station group includes all the base transceiver stations (TRX 1–36) operating under a given base station controller.

4. The method of claim 1, further comprising the step of maintaining, by the base station controller, an allocation table which shows the capacity unit allocation situation.

5. The method of claim 4, further comprising the step of selecting, by the base station controller, a new capacity unit to be allocated (73) in response to an input which is one of the following: an allocation request (71) by a base transceiver station in conjunction with a new connection request (70) by a terminal; a request (72) from a switching center for a connection to a certain terminal.

6. The method of claim 1, further comprising the step of permanently allocating a certain first part of the capacity units to a given base transceiver station so that a certain second part of the capacity units (TCH) is allocatable to a given base station group.

7. The method of claim 1, further comprising the step of allocating all capacity units (TCH) to a given base station group.

8. The method of claim 1, wherein the capacity units are cyclically recurring time slots such that a time slot allocatable to a given base station group can only be allocated in its entirety.

9. The method of claim 1, wherein the capacity units are cyclically recurring time slots such that at least one time slot allocatable to a given base station group can be allocated in partial time slots.

10. A transmission system for handling communication between base transceiver stations (BTS1–BTS12) and a base station controller (BSC) in a cellular radio network, wherein the transmission capacity of said transmission system is composed of a predetermined number of capacity units which can be separately allocated, said transmission system comprising at least one base station controller including means for indicating at least one capacity unit allocatable to a given base station group, which comprises at least two base transceiver stations, whereby the at least one base station controller is equipped so as to allocate said capacity unit to a first base transceiver station in the base station group when the instantaneous volume of traffic handled by said first base transceiver station requires temporary allocation of additional capacity.

* * * * *